Sept. 18, 1951     I. M. COLBETH     2,567,925

CONTINUOUS DEHYDRATION PROCESS

Filed March 25, 1948

INVENTOR.
IVOR M. COLBETH
BY Darby & Darby
ATTORNEYS

Patented Sept. 18, 1951

2,567,925

UNITED STATES PATENT OFFICE 2,567,925

CONTINUOUS DEHYDRATION PROCESS

Ivor Milton Colbeth, Maplewood, N. J., assignor to The Baker Castor Oil Company, Jersey City, N. J., a corporation of New Jersey Application March 25, 1948, Serial No. 16,915

35 Claims. (Cl. 260—405.5)

This invention relates to a continuous process for dehydrating esters of hydroxy fatty acids, and more particularly esters of hydroxy fatty acids having more than six carbon atoms per molecule.

The unsaturated drying oils which result from the process of this invention are described in my copending abandoned application, Serial No. 16,916, filed on March 25, 1948.

It has been known in the past that glycerides of hydroxy fatty acids may be dehydrated in a batch operation to increase their unsaturation. However, the previous time-consuming batch operations have suffered from the drawback of producing relatively large proportions of polymerized products, oxidized products, and other side-reaction products. In addition to the dehydration and polymerization reactions, pyrolysis of the hydroxy and dehydrated glycerides tends to occur. Pyrolysis is evidenced by the formation of decomposition products from the glycerides, e. g., the evolution of heptaldehyde vapors during the dehydration of castor oil; such decomposition product formation is indicative of the splitting of the carbon chains of the higher fatty acid radicals present in the glyceride molecules.

In accordance with my process, the unsaturation of such esters is increased, through the splitting out of water molecules from the esters by a combined dehydroxylation and dehydrogenation reaction, which is commonly known as dehydration. Those resulting unsaturated esters which are fully esterified esters of polyhydric alcohols having at least three hydroxyl groups per molecule are useful as plasticizers or drying oils, depending upon the extent of their unsaturation. Such esters having at least two double bonds per fatty acid chain are eminently suitable for use as drying oils. The other unsaturated ester products of this invention, namely, the esters of monohydric alcohols and the partially esterified esters of polyhydric alcohols are useful as plasticizers. The latter type of esters may also be used as components of alkyd resins.

The dehydration of hydroxyl-containing esters of oils to increase their unsaturation is a known commercial procedure. However, methods used up to this time for effecting this result have mainly suffered from the draw-back of being time-consuming and the products formed during the long periods during which the oils are held at elevated temperatures are of inferior quality owing to side-reactions, such as polymerization and oxidation processes. There is, therefore a great need for a process for dehydrating hydroxyl-containing oils which would be suitable for use on a commercial scale, and which would produce dehydration products rapidly with a minimum of polymerization and other objectionable side-reactions.

Among the undesirable impurities which may form during the dehydration of esters of hydroxy fatty acids are, for example in the case of ricinoleic glycerides, polymers of the ricinoleic-ricinoleic type, those of the ricinoleic-octadecadienoic type, polymers of undecylenic acid or derivatives thereof (said acid and derivatives being formed by pyrolysis of the glycerides), polymers derived from aldehydes (pyrolysis products) or from reaction products of the aldehydes with other constituents of the reaction mixture such as undecylenic acid, and other pyrolysis products and derivatives thereof. Other undesirable impurities of the same or similar types may form during the dehydration of esters of other hydroxy fatty acids having ten or more carbon atoms per molecule.

One of the objects of this invention is to produce esters of unsaturated fatty acids suitable for use as drying oils, plasticizers, and as reactants in various chemical processes. Another object is to produce such unsaturated oils by dehydrating the esters of hydroxyl-containing fatty acids in a continuous manner. Another object is to achieve this result in a short period of reaction. A further object of this invention is to produce dehydrated oils which will dry free from tack. Still another object of this invention is to produce dehydrated oils having a minimum of polymerization products, free fatty acids, and other objectionable impurities which cause after-tack in fresh films of said dehydrated oils. The production of unsaturated esters having high diene values is also an object of this invention.

Other objects will hereinafter appear.

It appears that it is difficult to dehydrate polymers of the ricinoleic-ricinoleic, and ricinoleic-octadecadienoic types. Consequently, the process of forming the products of this invention, as exemplified hereinafter, is particularly valuable in that it permits the dehydration of esters of hydroxy fatty acids to be carried to the desired degree of completion before any significant amount of polymerization occurs.

The process of this invention may be applied to any ester of a hydroxyl-containing aliphatic acid, said aliphatic acid having more than six carbon atoms per molecule, and preferably to those esters of hydroxyl-containing aliphatic acids, which aliphatic acids have more than ten carbon atoms per molecule.

The process of this invention yields drying oils as well as other types of products which are virtually free from pyrolysis products, because the continuous dehydration process is a rapid one (dehydration can be effected in times as short as five minutes when the reactor temperature is sufficiently high and an adequate number of reactors is used), and may be operated at lower temperatures than prior art processes. Polymerization and pyrolysis take place in proportion to the length and intensity of heating, and now that a method has been found for producing substantially completely dehydrated esters in brief periods, the undesirable reactions—polymerization and pyrolysis—are practically completely eliminated.

When the dehydration is substantially complete by the process described herein, those of the resulting unsaturated oils which are suitable for use as drying oils may desirably be polymerized at a temperature corresponding to or somewhat higher than the dehydration reaction temperature in reaction units to which no catalyst is added, to yield bodied dehydrated oils containing the octadecadienoic-octadecadienoic type of polymer, which dry satisfactorily and have no after-tack. Because of the increased viscosity of these bodied oils, they are of particular value in certain types of coating compositions. When the dehydration and polymerization reactions proceed simultaneously, as in previous processes, then fresh films of the resulting product containing ricinoleic types of polymer and other undesirable types of impurities as listed above, do not dry satisfactorily and have the undesirable property of after-tack.

The products of this reaction differ from previous, unsaturated, synthetically prepared esters in that fresh films of certain of the unsaturated esters of this invention are characterized by their non-tackiness, while fresh films of previously available, unsaturated, synthetic esters of the same type have been unsatisfactory because of their tacky nature.

The oils of this invention are prepared by the continuous dehydration of esters of hydroxy fatty acids in a manner to be later described. These continuously dehydrated oils are surprisingly and substantially free from objectionable polymers. Consequently, certain of these oils are eminently suitable for use as drying oils since they have drying properties which are markedly superior to those of the previously obtained oils of similar types. Coating compositions containing certain of these oils dry substantially free from after-tack, in contrast to similar oils obtained by previous processes. A further advantage of the more unsaturated products of this invention is that they have faster gel times and higher diene values (at equal viscosities) than those of similar oils known in the prior art. The unsaturated oils of this invention are eminently suitable for use in paints, varnishes, lacquers, printing inks, plastics, rubbers and the like compositions, and may be modified to form alkyd resins, and the like.

This continuous dehydration process may be applied to any ester, including glycerides, of a hydroxy fatty acid of vegetable or animal origin or to a synthetic ester of an equivalent hydroxy aliphatic acid. Examples of naturally occurring esters of this type are castor oil and quince seed oil. Other materials suitable as starting materials for this process may be obtained by the oxidation and/or hydroxylation of unsaturated oils or of synthetic esters of unsaturated aliphatic acids by known methods. Unsaturated, branched-chain aliphatic acids such as may be obtained from petroleum by the Fisher-Tropsch process, or by dehydrogenation of the Fisher-Tropsch products, are among the acids suitable for use in the production of the indicated esters.

As indicated above, products suitable for dehydration by the continuous process may be obtained by the oxidation of unsaturated oils by known methods or by any other suitable and convenient means for introducing hydroxyl groups into esters of aliphatic acids, said acids containing more than six carbon atoms per molecule, and preferably at least ten carbon atoms per molecule. Thus, esters of hydroxy aliphatic acids, such as dihydroxyoleic acid, ambrettolic acid, 9,10-dihydroxystearic acid, 3,12-dihydroxypalmitic acid, aleuritic acid, sativic acid, 10-hydroxystearic acid, jalapinolic acid, sabinic acid, juniperic acid, omega-hydroxydecanoic acid and the like, may be dehydrated by the continuous process. Also, the hydroxy and/or oxy glycerides formed as intermediates in the processes of Colbeth patents U. S. 2,125,544, U. S. 2,278,425, U. S. 2,278,426, 2,278,427 and U. S. 2,388,122 are suitable for dehydration by the continuous process.

Partial esters of the polyhydric alcohols may also be dehydrated in the same way. The following alcohols, methyl alcohol, butyl alcohol, benzyl alcohol, cinnamyl alcohol, propylene glycol, ethyene glycol, monoethyl ether, glycerine, pentaerythritol, sorbitol and the like are typical of the mono- and polyhydric alcohols whose hydroxyl-containing aliphatic acid esters may be dehydrated by the process of this invention. Much of the description of the process of this invention is herein related to its application to the processing of castor oil, but it is to be understood that other esters of hydroxyl-containing aliphatic acids can be processed in accordance with the invention.

Substituted derivatives (e. g., containing halogen or sulfur) of any of the foregoing esters may also be dehydrated by the continuous process. With halogenated esters, the halogen content should be such that the esters do not char when heated to dehydrating temperature. In the case of chlorinated esters, the chlorine content should be preferably less than about 15%. Such halogenated, unsaturated esters may be used in flameproofing compositions, in chemical reactions involving the interchange of the halogen for another chemical group, as plasticizers and the like. When certain of the dehydrating catalysts are used, some or all of the halogen is removed from esters of halogenated, hydroxy fatty acids during the continuous dehydration process. However, in order to obtain the effect of the halogen substituent in such instances, halogen may be introduced into the dehydrated ester molecules following the completion of the dehydration reaction.

Continuous dehydration process

For illustration, the preparation of the unsaturated ester by means of the continuous dehydration process will be illustrated in terms of the dehydration of castor oil, but it should be understood that unsaturated esters can be obtained from esters of other hydroxyl or oxy fatty acids in the same or equivalent manner. Reference may be had to the accompanying drawing, in which Figure 1 shows a series of reactors through which the oil being dehydrated is caused to flow.

Figures 1, 2:
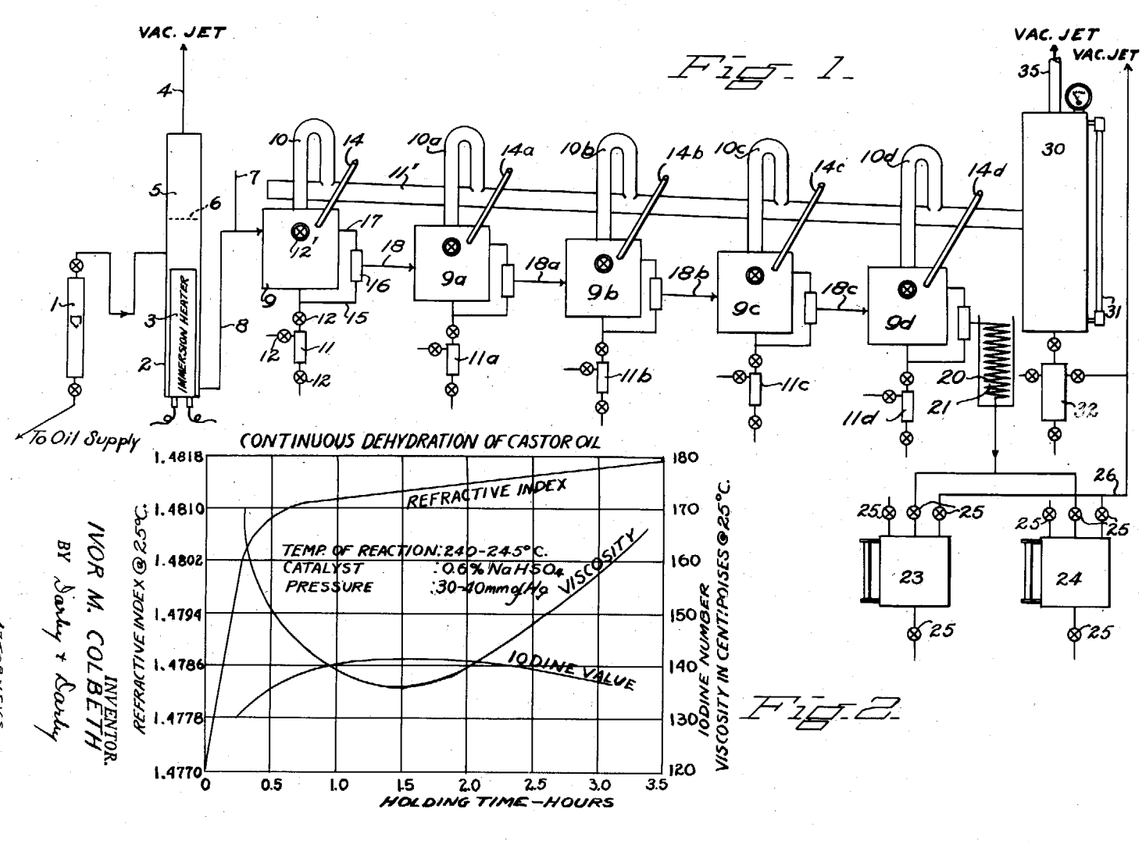
Figure 1 illustrates suitable apparatus for carrying out the continuous dehydration process.
Figure 2 is a chart showing certain properties of dehydrated castor oil prepared according to the process of this invention. As will be described hereinafter.

The oil which is charged to the apparatus designed for continuously carrying out the dehydration process may be obtained from any suitable oil supply. This oil supply may be maintained at any desired temperature, but it has been found to be convenient to maintain it at or about room temperature. The continuous charge of oil from the oil supply, such as an oil storage tank, may be pumped or allowed to flow by gravity at the desired rate into the apparatus. A suitably calibrated rotameter 1 may be used for measuring the rate of flow. Alternatively, the oil supply may be equipped with a gauge capable of measuring the flow of the oil from the oil supply container.

It has been found desirable to preheat the oil before its introduction into the first reaction zone. In this way, the reactors can be utilized for the purpose for which they were designed rather than for heating the oil up to reaction temperature. The preheater 2, is heated by means of an electric immersion heater 3. Alternate methods of heating the oil, such as by the use of steam preheaters may be used. In the case of the electric immersion heater, it is important that it be covered by oil at all times. The preheater 2 is evacuated by means of a vacuum jet 4. In this way, air dissolved in the oil can be removed readily before introduction of the oil into the hot evacuated reaction units. Sufficient space 5 is provided above the oil level 6 in the preheater, so that no oil is carried out through the vacuum jet during the frothing of the oil occasioned by the air removal therefrom. It is desirable to preheat the oil to the preferred reaction temperature, i. e., to about 225–255° C. The temperature of the oil leaving the preheater may be checked by a thermometer 7 or a thermocouple in the line 8 between the preheater 2 and the first reaction unit or chamber 9. Preheating should bring the initial temperature up to at least 160° C.

From the preheater, the oil is pumped into the first reaction unit 9 of a series of such chambers. These chambers are preferably constructed from stainless steel, but other materials which are not affected by the reaction mixtures may be used. The units may be of any suitable dimensions. Thus, for units to which are fed approximately 100 lbs. of oil per hour, the inside diameter of the reaction unit may be approximately 10" and the height of oil in the unit may be about 12". For larger throughputs, the units may be suitably enlarged. In order to prevent carry-over of fluids to the vacuum manifold 11', the units are maintained no more than one-half full, and the line 10 has a relatively large diameter.

Appropriate mechanical agitation may be provided, when needed, to improve the contact of the oil and the catalyst. The reaction speed may be increased in this way, especially when larger reaction units are used.

The vacuum is applied to the unit 9 by means of the line 10. This line connects to the vacuum manifold 11'. A sight glass 12' is supplied for the unit. The latter is also equipped with a thermometer or thermocouple, not shown. Samples may be taken from the unit at any time by means of the sampler 11 by appropriate manipulation of the indicated valves 12.

Catalyst is fed into the reaction unit 9 through the line 14. The catalyst may be introduced as an aqueous or other solution of the catalytic material or as an aqueous or other slurry of a solid catalyst. The rate of catalyst introduction into the unit may be controlled and measured in any suitable fashion. The catalyst is well distributed throughout each reaction zone or chamber.

As the catalyst is introduced, the oil being at reaction temperature, the dehydration reaction gets under way. The water vapor formed in the dehydration is drawn off through the pipe or line 10, along with the water vapor formed from the water introduced with the catalyst. At the same time, any free fatty acid that is present as such in the oil charge or is formed by hydrolysis of the ester distils from the reaction mixture, and is also removed through line 10. There is only slight hydrolysis of the oil, and the free fatty acid content of the oil is maintained at a minimum value because of this removal of the fatty acids by distillation. Sufficient space is provided above the oil level to allow for any frothing occasioned by the distillation of the water and fatty acid from the reaction mixture. For the same reason, the line 10 is of a relatively large diameter. With these precautions, it is found that there is no oil carryover due to frothing into the vacuum manifold 11'.

The reaction units may be heated in any desired manner. It has been found that effective heating may be obtained by means of electric strip heaters positioned around the outside of the reaction unit. The heaters and the portions of the unit not covered by them are preferably covered with heat insulating material.

In the equipment illustrated in the figure, gravity flow is utilized for moving the oil from unit to unit. Other suitable means for effecting this oil transfer may be used alternatively.

As the oil proceeds from the first reaction unit 9 through pipe 15 to the next reaction unit 9a, it passes through a gas bottle or separating container 16 which acts as a vent to assure smooth gravity flow of the oil. Any vapor separated at 16 is liberated through line 17 to the upper part of chamber 9 and thence to manifold 11'. The oil from 16 flows through feed line 18 into the next reaction chamber 9a.

The succeeding reaction units 9a to 9d, inclusive, are duplicates of the first reaction unit 9. The accessories for these additional units are similar to those provided for the first unit in the series and include lines 10a to 10d, samplers 11a to 11d, catalyst lines 14a to 14d, and feed lines 18 to 18c, inclusive.

The oil leaving the last unit 9d in the series passes through a cooling coil 20 in cooler 21. The oil line passing through the cooler should have a sufficiently large diameter so that the oil is not held up in the cooler due to the increased viscosity of the cooled oil. From the cooler, the oil line continues to two duplicate product receivers 23 and 24. Two receivers are provided so that one may be on stream, while the other is being discharged. Appropriate valves 25 are provided for these receivers and, when on stream, the receivers are evacuated through the vacuum line 26.

To return to the vacuum system, the vacuum manifold 11' terminates in a large trap 30. This trap collects part of the water and fatty acids which distil from the several reaction units; the non-condensed water and fatty acids pass out of the system via the vacuum jets. When the liquid level in the trap is fairly high, as may be determined by inspection of the liquid level gauge glass 31, the liquids in the trap can be drained out through the small cylinder 32. The trap is connected to a vacuum pump by means of the pipe 35.

The equipment described in the foregoing and illustrated in Figure 1 need not be used exactly as indicated. Thus, the first reaction unit 9 may be used as a preheater, in addition to the preheater 2. In this case, no catalyst would be added to reaction unit 9. If a relatively slow rate of throughput of oil is being used, it is possible to omit preheater 2 entirely, and use reaction unit 9 as the only preheater. It has also been found to be desirable, in certain cases, to use the last reaction unit 9d as a holding unit in which the reaction is completed without the addition of any fresh catalyst. More or fewer reaction units than the number indicated in Figure 1 may also be used, depending upon the particular reaction conditions. The larger the number of the reaction units, the greater is the amount of dehydrated ester which can be formed in a given time. It will be apparent that other variations in the reaction assembly may be made without departing from the spirit of this invention and that Figure 1 merely indicates a particular apparatus which has proven useful in carrying out the continuous dehydration.

Another satisfactory method for carrying out the continuous dehydration process is one in which the oil being treated is allowed to flow down over a series of trays contained in a heated column. Other suitable arrangements of apparatus will be apparent to those skilled in the art.

Important requisites for a satisfactory apparatus to be used in the continuous dehydration process to produce the products of this invention are as follows:

(I) Provision for segregating completely dehydrated oil from partially dehydrated oil;

(II) Provision for adding catalyst continuously in desired and varied proportions and at several locations simultaneously;

(III) A finishing or holding zone in which the reaction is carried to completion.

*Discussion of continuous dehydration process and of reaction conditions*

As has been stated in connection with the description of the apparatus in Figure 1, the oil being dehydrated is treated by a stepwise process, fresh catalyst being added in each reaction unit to spur the reaction to completion. Since little or no reaction occurs in units to which no fresh catalyst is added, it is possible to influence the reaction time by the number of units to which catalyst is added. The nature of and the amount of the catalyst used also play their parts in determining the time required for the completion of the dehydration reaction.

In the continuous process of this invention, each reactor, in the direction of oil flow, contains oil which is progressively more completely dehydrated. Raw oil is introduced into the reactor containing the oil which has undergone the least amount of dehydration; there is no possibility of the relatively completely dehydrated oil being diluted with the raw oil charge.

As a result, dehydration of any particular portion of oil is carried to completion in a shorter time than would be possible if the dehydration were carried out as a one-step process (in a single reactor). This continuous, stepwise process is a major factor in cutting down the reaction time, and, consequently, in the preparation of high quality dehydrated esters.

As has been indicated, other factors which can be utilized in controlling the reaction time are the rate of throughput of the ester being dehydrated, the number of reactors, and the reactor temperatures. Incidentally, the actual reaction time may readily be determined in any particular instance when the volume of the oil-containing portions of the reaction unit and the rate of throughput of the oil are known.

The progress of the dehydration may be followed by taking samples at desired intervals from the several reaction units, and checking the properties of the oil by such tests as the following: refractive index, iodine number, and viscosity. Figure 2 illustrates how these factors change with time of reaction and indicates how the completion of the dehydration reaction may be determined. The data presented in this figure are a composite of the results obtained in a number of typical continuous dehydration runs made under the following conditions: 240–245° C.; 0.6 wt. percent of sodium acid sulfate (introduced as a 12% aqueous solution); and a pressure of 30–40 mm. of mercury.

When the holding time is from 1.0 to 1.5 hours under the conditions stated, as will be determined by inspection of Figure 2, the refractive index (25° C.) of dehydrated castor oil prepared under these conditions falls in the range from about 1.4811 to about 1.4813. The iodine number (Wijs) of this product is 140–142 while its viscosity (25° C.) ranges from about 136 to about 140 centipoises.

The reaction rate can be varied by making changes in the temperature of the reaction units, in the selection of the catalyst, in the concentration of the catalyst and in the amount of catalyst used. At higher temperatures than those used in the runs of Figure 2, the several curves have the same characteristics, but, due to the shorter reaction times, the curves are compressed, giving a sharper peak to the iodine number curve and a more abrupt minimum point on the viscosity curve. Consequently, in runs made at such higher temperatures, the analytical data, instead of indicating completion of dehydration at about 1.5 hours, will indicate that the dehydration reaction is complete at some shorter time, such as 0.5 hour. Such shorter reaction times ranging down to less than 0.5 hour, may be obtained by operating at temperatures of 250–255° C., and even shorter reaction times ranging down to five to ten minutes, may be attained at even higher temperatures, for example at 275° C.

For the particular conditions of the runs whose results are presented in Figure 2, the refractive index data indicate that most of the dehydration occurs within 0.5 hour, and then continues slowly thereafter. The completion of the dehydration in 1.3–1.5 hours is indicated by the iodine number results and is confirmed by the viscosity data. The rise in the viscosity curve and the fall in the iodine number curve after the 1.7 hour mark is passed indicate bodying of the dehydrated oil by means of a polymerization reaction. Thus, the highest quality dehydrated castor oil is obtained, under the particular set of conditions of Figure 2, by limiting the holding time to 1.3–1.5 hours, a time period corresponding to the minimum on the viscosity curve; this minimum indicates dehydrated castor oil having a maximum degree of dehydration and a minimum degree of objectionable polymerization.

In general, the best procedure for obtaining products having optimum properties is to stop the dehydration process somewhat before the minimum viscosity is attained; in fact, useful products are obtained by stopping the reaction when it is from about 50% to about 100% complete, the completeness of the reaction being indirectly proportional to the acetyl value of the product (the acetyl value of a substantially completely dehydrated ester being less than about 10, as determined by the American Oil Chemists' Society Official Method Cd 4-40). The products obtained by utilizing this procedure are substantially completely dehydrated (when the reaction is allowed to go substantially to completion), and contain an absolute minimum of objectionable polymerization products.

Viscosity measurements may be used to make a comparison between the amounts of polymer present in various dehydrated oils. For example, the viscosity of castor oil is 675 centipoises. The minimum viscosity for dehydrated castor oil corresponds to the viscosity of unbodied linseed oil, a comparable oil, the viscosity of such linseed oil being 50 centipoises. On the basis of the 625 centipoise range (between the above two viscosities), it is possible to calculate the percentage by which a particular dehydrated castor oil has failed to attain the indicated minimum viscosity. It has been found that continuously dehydrated castor oils may be obtained which have viscosities within 8.0–18.4% of the minimum viscosity, while the lowest similar figure attainable by previous dehydration methods is 32.0%. Thus, the oils represented by the 8.0–18.4% range are said to contain a minimum of objectionable polymer while oils having viscosities in the preferred D-E (Gardner-Holdt), or 100-125 centipoises, viscosity range are within 8.0–12.0% of the indicated minimum viscosity.

As regards the vacuum which should be maintained on the reaction units, it has been found, in general, that the better the vacuum, the better the color of the dehydrated oil. The decreased color undoubtedly results from a more complete absence of air, the lowered air concentration resulting in decreased darkening of the oil. The purity of the dehydrated oil is increased with improved vacuum, since, as the vacuum improves, the fatty acid content of the dehydrated oil decreases to a minimal figure. As an alternative measure for preventing oxidation of the oil, inert gases may be introduced into the reaction units to provide an inert atmosphere at or below atmospheric pressure.

In addition to the advantages already cited for the use of multiple reaction units, there is the further advantage that the large amount of heat required for maintaining the reaction temperature and for vaporizing the water charged to or formed in the reaction units can be supplied more effectively to the contents of several small reactors than to a single large reactor containing the same quantity of oil. The larger the number of reactors (the total volume being constant), the speedier is the heating of a unit volume of oil. This is true because, as the number of reactors is increased, the extent of the heating surface with which the oil comes in contact becomes progressively greater.

The rate of production of unsaturated esters is a function of temperature, amount and concentration of catalyst and the number of reactor units. If the reaction temperature and the amount and concentration of catalyst are held constant, the production rate can be increased by increasing the number of units in the reaction system. In other words, the better heating obtainable through the use of the process of this invention makes it possible for the dehydration reaction to be completed in a shorter time than would otherwise be possible. This is a valuable feature of this process, since, the extent of the oxidation and polymerization reactions which fatty acid esters may undergo being directly proportional to time, such undesirable reactions may be largely eliminated by decreasing the time required for the dehydration reaction. It is also found under these conditions (multiple reactors) that the final product is freer from nondehydrated oil. In any particular case, the number of reactors to be used will be based on a balance between economy and performance.

It is economical to utilize several small dehydration units as opposed to one large unit. Further important economies can be achieved by effecting heat exchange between the outgoing product and the incoming charge. In this way, the amount of electrical or other heat required and the cost thereof can be reduced effectively. In the usual batch dehydration process, the heat content of a batch of oil which has just been dehydrated is largely dissipated, while, in the case of the continuous process, the oil charge may be used as a cooling fluid for the cooler 21 of Figure 1, thereby being preheated without any extra cost. As a consequence, the separate preheater 2 may be eliminated or greatly reduced in size.

The catalysts for this continuous dehydration process may be either solid or liquid catalysts. Suitable catalysts are non-oxidizing mineral acids, such as sulfuric, sulfurous, phosphoric, hydrochloric, and boric acids as well as the reaction product of boric and sulfuric acids (boryl pyrosulfate), the acid salts of such mineral acids, such as the sodium and calcium salts, the easily decomposable organic esters of such acids, such as organic sulfuric acid esters, and the oxides of metals and metalloids of groups III, IV and VIII of the periodic system, such as the oxides of aluminum, nickel, iron, boron, titanium, and silicon. This list of catalysts is illustrative of the sort that can be used in the dehydration of hydroxy esters.

Before introduction into the reaction units, the catalyst may be dissolved in a solvent, emulsified in water (in the case of a liquid catalyst which is insoluble in water) or suspended in a suitable carrier liquid in the form of a slurry (in the case of an insoluble solid catalyst). Quite satisfactory results are obtained by using less than 1% of catalyst, based on the weight of oil charged.

The preferred catalyst for the continuous dehydration of oil, such as castor oil, is a somewhat volatile and/or decomposable liquid catalyst. Sulfuric acid is such a catalyst, and performs well in concentrations of about 4% to about 7% in water solution.

A solid catalyst is next in the order of preference. Such a catalyst may be introduced into the reaction zone either in solution or as a slurry. In either case, the catalyst is present as a sludge in the dehydrated oil, from which it may be separated by filtration.

When constant amounts of catalyst are introduced into the various reactors continuously, and since the amount of dehydrated ester increases and the amount of unreacted ester decreases from reactor to reactor, larger proportions of catalyst are continuously being introduced into the successive reactors based on the amount of the starting product present. If desired, however, the rate of catalyst addition may be varied among the several reactors, and the proportion of catalyst to undehydrated starting product may be increased or decreased as the reaction progresses. As long as the total amount of catalyst used is held constant, the amount of catalyst added to any one reaction unit may be as little as ⅕ of the maximum unit catalyst addition without having any substantial effect on the characteristics of the product.

Before the dehydrated oil is used in coating compositions, or processed in other ways, it is customary, although not essential, to subject it to a polishing (i. e. bleaching) operation. This operation consists in mixing small amounts of filter aid and of activated carbon black with the dehydrated oil, heating the mixture for a short time, and filtering. In this operation, solid catalysts may be removed readily from the dehydrated oils.

*Illustrative examples*

Examples of runs made illustrating the production of the continuously dehydrated esters of this invention follow:

*Example I.*—The equipment assembled as indicated in Figure 1 was used in this run for the dehydration of pure castor oil. The oil was fed to the reactors at the rate of 1000 gms. per hour. The catalyst, a 12% aqueous solution of sodium acid sulfate, was introduced into each reaction unit at the rate of 10 cc. per hour, this amounting to 0.6% by weight of solid sodium acid sulfate, based on the weight of oil charged. The reaction units were maintained at a temperature of 240–245° C. The pressure on the units was held at 32–37 mm. of mercury. The run was continued for nine hours, while the holding time was calculated to be 1.3 hours. The distillate collected in trap 30 amounted to 667 gms. of water and 86 gms. of free fatty acid. The dehydrated castor oil obtained in this run amounted to 18.5 lbs. This oil was bleached with 2% of a neutral-reacting acid-activated bleaching earth and 0.5% of an activated carbon decolorizer and deodorant, somewhat more than 2 gallons of bleached product being produced. The bleached dehydrated castor oil from this run had the following characteristics:

Color (Lovibond scale) ____ 20.0 yellow; 5.3 red.
Viscosity at 25° C __________ 137.6 centipoises.
Refractive index at 25° C___ 1.4813.
Per cent free fatty acids____ 1.70.
Saponification value _______ 189.4.
Acetyl value________________ 14.0.
Iodine value (Wijs) ________ 142.8.
Neutralization value _______ 3.40.

*Example II.*—In this example, pure castor oil was dehydrated at a faster rate and on a larger scale than in Example I. In this case, the pressure amounted to 178 mm. of mercury, the temperature of reaction was 245° C., the castor oil was fed to the reactor at a rate of 150 lbs. per hour, the catalyst was a 5.5% aqueous solution of sulfuric acid and was fed to each of the three reaction units, 9a, 9b, 9c, at the rate of 1200 cc. per hour (amounting to 0.3% by weight of concentrated sulfuric acid, based on the weight of oil charged), and the holding time was 0.6 hour. After this run had been under way for some time and had reached a steady state, the product (dehydrated castor oil) was collected over a period of half an hour. A material balance taken during this period indicated that the dehydrated castor oil collected amounted to 96.7% by weight of the castor oil charged to the reactors. Two gallons of the dehydrated castor oil were polished for test purposes. The analytical data on this product are given below:

| Characteristics | Actual Numerical Values |
|---|---|
| Color | 5+ |
| Refractive Index (25° C.) | 1.4809 |
| Spec. Grav | 0.940 |
| Per Cent Free Fatty Acid | 2.86 |
| Viscosity (25° C.)____centipoises | 175 |
| Iodine Value (Wijs) | 135.7 |

It will be noted that the iodine value of the dehydrated castor oil obtained in this more rapid reaction is about the same as that of the dehydrated castor oil formed in Example I. The drying speed of this Example II product is fully equal to that of any of the other dehydrated castor oils formed by this continuous method and superior to that of dehydrated castor oil produced by other processes.

*Example III.*—Castor oil was dehydrated continuously in a 5-unit system assembled as indicated in Figure 1, the first unit being used as a preheater. The reaction units were maintained at a temperature of 250° C., and under a pressure of 15–20 mm. of mercury. The holding time was calculated to be 36 minutes. The catalyst was sodium acid sulfate, in dilute aqueous solution, 0.6% of solid sodium acid sulfate, based on the weight of oil charged, being introduced into the last 4 of the 5 reaction units. The dehydrated castor oil formed had a pale color, essentially the same as that of the castor oil charge. The iodine value of the dehydrated oil was 145, and the viscosity was 98 centipoises at 25° C.

*Example IV.*—Linseed oil which had previously been blown with air at about 200°–225° F. until said oil contained oxy-groups, peroxides, and polymers as indicated by an increase in refractive index from 1.4789 to 1.4830, was used in this process. With pressure at 178 mm. of mercury and temperature of reaction at 245° C. the oil was fed to the reactors at a rate of 90 lbs. per hour. The reaction time was 1.0 hour and the catalyst was 5.5% boryl pyrosulfate (prepared in accordance with U. S. Patent 2,317,362) in water solution, fed to each of the reaction units, 9a, 9b, 9c at the rate of 720 cc. per hour (amounting to 0.3% by weight of boryl pyrosulfate based on the weight of oil charged). After the reaction had reached equilibrium, two gallons of the product were polished for test purposes. The analytical data on this product follow:

Color (Gardner scale) __________________ 12
Ref. index (25° C.) _____________________ 1.4847
Per cent free fatty acid_________________ 1.01
Saponification value____________________ 199.4
Iodine value____________________________ 145.6
Viscosity (25° C.)_______________centipoises__ 370
Gel time (Browne heat test)_______minutes__ 97

This oil was then bodied to a Z–3 viscosity (4630 centipoises) to form a very useful paint and varnish oil with properties much improved over a regular linseed stand oil. The bodying may be performed continuously or as a batch operation. The product has these properties:

| | |
|---|---|
| Color (Gardner scale) | 15 |
| Viscosity (25° C.) centipoises | 4630 |
| Sp. gr. (15° C.) | 0.974 |
| Ref. index (25°) | 1.4895 |
| Saponification value | 202.4 |
| Iodine value | 126.8 |
| Gel time (Browne heat test) minutes | 37 |

*Example V.*—Alkali refined soybean oil was blown at 125° C. with ozone-enriched air until its refractive index had increased from the orginal 1.4722 to 1.4775. This processing caused the iodine value of the oil to drop from 138.3 to 102.2, and the viscosity simultaneously increased from A to M (Gardner-Holdt), i. e., from 50 to 320 centipoises. The blown oil was then dehydrated in equipment assembled as indicated in Figure 1. The reaction units were maintained at 250° C. and under a pressure of 32–37 mm. of mercury. The catalyst was sodium acid sulfate, in dilute aqueous solution, 1.0% of solid sodium acid sulfate, based on the weight of oil charged, being introduced into the reaction units. The refractive index of the final dehydrated oil was 1.4815, and its viscosity was V+ (Gardner-Holdt), or 930 centipoises.

This oil was then evaluated by cooking it with a modified phenolic resin to form a varnish. The resulting varnish was found to have a dry time of 13 hours and 40 minutes (as determined by means of a Gardner dry-time recorder), while a similar varnish prepared from unprocessed soybean oil had a dry time of greater than 30 hours.

*Example VI.*—In this example, butyl ricinoleate was dehydrated to produce the butyl ester of octadecadienoic acid. With pressure at 178 mm. of mercury and temp of reaction at 240° C., the butyl ricinoleate was fed to the reactors at a rate of 90 lbs. per hour. The reaction time was 1.0 hour and the catalyst was 5.5% sulfuric acid, which was fed to each of the three reaction units, 9a, 9b, 9c, at the rate of 720 cc. per hour. This amounted to 0.3% by weight of conc. $H_2SO_4$ based on the weight of ester charged. The run was continued long enough to reach equilibrium, and two gallons of the product were polished for test purposes. The analytical data on this product were:

| | |
|---|---|
| Color (Gardner scale) | 7 |
| Ref. index (25° C.) | 1.4609 |
| Sp. gr. (15° C.) | 0.883 |
| Per cent F. F. A. | 3.82 |
| Viscosity (25° C.) centipoises | 14.4 |
| Saponification value | 164.7 |
| Iodine value | 128.0 |

*Discussion of examples*

An advantage of the dehydrated oils formed by the continuous process is their uniformity as compared with similar oils prepared by batch methods. Also, as indicated in the foregoing, the continuously dehydrated oils having at least two double bonds per fatty acid chain and, in general, more than two such chains per oil molecule, have superior drying properties, since such oils are practically free from objectionable polymer. As a result, coating compositions formed with such oils dry much faster and are freer from after-tack than when oils are used which have been dehydrated by slow processes and which contain relatively large proportions of non-drying polymer.

A comparison of the polymer contents of batch dehydrated castor oils and continuously dehydrated castor oils is given by the following viscosity data. By the batch process, the minimum viscosities attainable are G–H (on the Gardner-Holdt scale), or 165–200 centipoises. By the continuous process, dehydrated castor oils having D–E viscosities (100–125 centipoises) can be produced. Oils having a D viscosity can be regularly prepared by proper control of the operating variables; such as rapid throughput of oil; adequate reaction temperature; suitable catalyst and catalyst concentration; extensive vacuum. In fact, it has been found that, at any refractive index which may be chosen, the continuously dehydrated esters formed by the process of this invention have substantially lower viscosities than those of batch-dehydrated esters prepared from the same starting materials. Thus, at a refractive index (25° C.) of 1.4805, a continuously dehydrated castor oil formed by the process of this invention will have a viscosity of less than about 140 centipoises. It has previously been impossible to prepare a dehydrated castor oil having such a low viscosity.

Such low viscosity drying oils are especially interesting, being not hitherto available. They have been found to be quite desirable constituents of printing inks and house paints, applications in which low viscosity and rapid drying properties are important. Also, being much purer from a chemical standpoint than oils containing various amounts of mixtures of polymers, these low viscosity dehydrated esters are eminently suitable for use as reactants in chemical syntheses, such as the formation of partial esters of unsaturated fatty acids and polyhydric alcohols, alkyd resins, and the like, as are described more fully below. The high viscosity oils, such as may be obtained by the bodying of the dehydrated esters formed by the process of this invention, are used in large amounts in coating compositions for a variety of purposes, or may be cooked with resins to form high quality varnishes.

A further advantage of the continuously dehydrated oils is that those having at least two double bonds per fatty acid chain have higher diene values (at equal viscosities) than do the corresponding batch dehydrated oils. These higher diene values may be attributed to the short reaction times required in the continuous process. As a result of the decreased exposure to head, ester molecules containing fatty acid radicals with conjugated unsaturation have less opportunity to polymerize; (polymerization proceeds by linking of the carbon atoms attached to olefinic bonds in different molecules, thus causing a decrease in the diene value). Since the conjugated system of double bonds is more reactive than non-conjugated pairs of double bonds, oils containing conjugated double bonds (such as the continuously dehydrated oils of this invention) dry faster than oils having non-conjugated double bonds. Of course, dehydration can occur without producing conjugated double bonds. However, since the diene number is a measure of the conjugated unsaturation in a product, and since oils having sufficient fatty acid chains characterized by conjugated unsaturation have quite rapid drying times and films prepared therefrom have minimal after-tack, it is readily apparent that the drying oils produced by the process of this invention, having substantially higher diene numbers (at any particular refractive index) than those of previously available, unsaturated, synthetic esters have remarkably desirable characteristics. Thus, at a refractive index (25° C.) of 1.4805, a continuously dehydrated castor oil of this invention will have a diene value of greater than about 24.0. It has previously not been possible to prepare a dehydrated castor oil having such a high diene value.

Since polymerization is held to a minimum by the short reaction times which are a feature of the continuous dehydration process, there is little opportunity for polymer formation until after the completion of the dehydration reaction, which, when esters of monohydroxy, mono-olefinic acids and the like are dehydrated, results in the formation of octadecadienoic acid-type esters; subsequent polymerization, as a consequence of further heating, yields the desired octadecadienoic-octadecadienoic type of polymer. As such polymerization proceeds, there is an attendant decrease in the diene value of the oil, since, as indicated above, the linking of monomeric molecules to form polymeric molecules occurs at the location of the conjugated double bonds.

The following data on conjugated unsaturation (diene values) are indicative of the advantages inherent in drying oils formed by the process of this invention:

| | Reaction Time | Conjugated Unsaturation | Refr. Ind. | Visc. (25° C.) |
|---|---|---|---|---|
| Batch-dehydrated Castor Oil ($H_2SO_4$ catalyst) | Hours 2.0 | Per cent 22.2 | 1.4814 | Cps. 185 |
| Continuously dehydrated Castor Oil ($NaHSO_4$ catalyst) | 1.3 | 26.3 | 1.4813 | 138 |

These data on percent conjugated unsaturation are based on the ultraviolet absorption spectra of the two oils at 2340 Å., the measurements being made with a Beckmann quartz spectrophotometer. The method used corresponds to that of Bradley and Richardson, Inc. Eng. Chem. 32, 963–9 (1940). The formula used for calculating percent conjugated unsaturation is as follows:

Per cent conjugated unsaturation=

$$\frac{density \times 100}{1200 \times concentration}$$

The optical density is read directly from the dial on the spectrophotometer, and corresponds to the logarithm of incident light/transmitted light. The figure 1200 is the extinction coefficient at 2340 Å., which is the wave length corresponding to the greatly increased absorption characteristic of two conjugated double bonds in a straight-chain aliphatic compound. The concentration is expressed in terms of grams of sample per 100 cc. of solution.

The dehydrated castor oil and the dehydration products of other fully esterified esters of hydroxy fatty acids formed by the process of this invention are suitable for the manufacture of mono-glycerides and partial esters of other polyhydric alcohols by interaction with glycerin or another polyhydric alcohol in the presence of an ester-interchange catalyst. Such partially esterified esters may be conveniently prepared in additional reaction units attached to the last reaction unit of the continuous dehydration apparatus. These additional units may be similar to the dehydration units, and equipped for vacuum or atmospheric pressure operation. The polyhydric alcohol, e. g., glycerin, and ester-interchange catalyst, such as litharge, are introduced to the additional units through a line such as the catalyst lines indicated in Figure 1. The advantages of such a method of forming partially esterified esters are that the latter compounds are formed in a convenient, continuous manner, and that the dehydrated oil feed is already at or about reaction temperature for the ester interchange reaction, thereby making for a speedy and continuous method for preparing unsaturated partial esters directly from fully esterified esters of hydroxy fatty acids, which are the starting materials of the continuous dehydration process.

The resulting partially esterified esters may be condensed with phthalic anhydride or various polybasic acids to form fatty acid-modified alkyd resins, or alkyds may be formed directly from the dehydrated oils by reacting the latter with glycerin or another polyhydric alcohol and a polybasic acid or anhydride. The alkyd resins may be prepared in the same manner as indicated for the continuous formation of partial esters from the fully esterified polyhydric alcohols. Thus, further reaction units may be attached to the units in which the partial esters, e. g., monoglycerides, are prepared, such further units being utilized for the synthesis of alkyd resins. The partial esters are fed in continuously from the units in which they are prepared, while the polybasic acid compound, e. g. phthalic anhydride, is charged, along with the reaction catalyst, e. g. litharge, to the same reaction unit. The alkyd resins are, thereby, formed continuously in one or more reaction units, the whole assembly from esters of hydroxy fatty acids to alkyd resins being treated as one continuous operation.

A particularly desirable material for use in the manufacture of alkyd resins is that formed by carrying the continuous dehydration of esters of hydroxy fatty acids to a point intermediate between the esters of hydroxy fatty acids and completely dehydrated esters. A convenient technique for preparing these partially dehydrated esters in the continuous process involves the use of just enough catalyst to effect the desired degree of dehydration. Hydroxy esters which are from about 50% to about 65% dehydrated, as determined from graphed curves of their physical properties, as in Figure 2, are preferred in this regard. These partly dehydrated oils have the advantage over the substantially completely dehydrated oils that reaction mixtures (for the preparation of alkyd resins) containing the former are slow bodying. This permits cooking of the reaction mixture, without danger of gelation, until the acid number of the mixture has been reduced to the desired point. The advantages of using partially dehydrated esters prepared by the continuous method are: there is less polymerization of the esters during dehydration than is the case with dehydrations effected by the batch method; since there is less polymer formation, a better conversion to the desired partial esters can be effected; it also follows that lower viscosity alkyds can be produced than when corresponding esters prepared by previous processes are used; these new alkyds have a greater solvency in thinners than do alkyds prepared from similar oils available by previous processes; the ester molecules which retain their hydroxyl groups during the dehydration effectively plasticize the alkyd resin molecules of which they form a part.

The preparation of these alkyds with the especially advantageous properties will be described with respect to the use of a partially dehydrated castor oil prepared by the continuous method as the starting material. Fairly long oil-length alkyds can be prepared from this partially dehydrated oil, approximately 40% of oil being about the minimum amount of this oil which should be used. The refractive index (25° C.) of the partially dehydrated castor oil used in these illustrative examples was 1.4795–1.4800; the refractive index of the starting oil was 1.4775, and the refractive index of the corresponding completely dehydrated oil was 1.4815.

Example VII.—Equipment assembled as indicated in Figure 1 was used in this run, additional reactors being connected to the reactor 9d through a vacuum release chamber, as it is not usually necessary to carry out the alkyd resin formation under vacuum. To the first additional reactor were charged, per 50 parts by weight of the partially dehydrated castor oil described above, 19.6 parts by weight of a high gravity glycerine and 0.14 part by weight of litharge. (From 0.05% to 0.50% of another alkaline catalyst may be substituted for the litharge.) The reactor or reactors used for this mono-glyceride formation should be maintained at 435° F. The holding time for this phase of the reaction is about 90 minutes. The monoglycerides formed in this phase then pass on to a non-heated chamber, and 34.6 parts by weight of phthalic anhydride, per 50 parts of the partially dehydrated castor oil, are added at this point. This mixture then passes on to a reaction unit or units heated to 420° F. The holding time (for the phthalic anhydride-monoglyceride reaction) required to produce an alkyd resin having an acid number of less than 15 is approximately 1 hour. The finished alkyd resin then passes through a cooler similar to cooler 21, is thinned with mineral spirits, and filtered.

Example VIII.—Another alkyd resin was prepared in a manner similar to that of Example VII. The oil content of the alkyd in this case was 60%, while, in Example VII, the oil content was 50%. Thus, 14.9 parts by weight of glycerine and 28.6 parts by weight of phthalic anhydride were used per 60 parts of the indicated partially dehydrated castor oil. The reactor temperatures were similar, except that the phthalic anhydride-monoglyceride reaction was carried out at 435° F.

Alkyd resins are of great value for use in various types of coating compositions. The partial esters obtainable from the dehydrated oils of this invention have various other applications than their use in forming alkyd resins, such as their use as plasticizers and emulsifying agents.

While this invention has been described in terms of specific examples, it is not intended that it should be limited thereby.

What is claimed is:

1. A continuous stepwise method for dehydrating an ester of a hydroxyl-containing fatty acid having more than six carbon atoms which comprises passing said ester at an elevated temperature in the substantial absence of gaseous oxygen through a plurality of reaction vessels in the presence of a dehydration catalyst distributed throughout said reaction vessels, and introducing said catalyst into more than one of said reaction vessels in controlled amounts during the course of the dehydration reaction.

2. The method of claim 1 carried out under a subatmospheric pressure of less than 0.5 atmosphere.

3. The method of claim 1, in which said elevated temperature is in the range from about 200° to about 275° C.

4. The method of claim 1, in which said dehydration catalyst is dilute aqueous sulfuric acid.

5. The method of claim 1, in which said dehydration catalyst is dilute aqueous boryl pyrosulfate.

6. The method of claim 1, in which said dehydration catalyst is used in amounts of less than one per cent by weight based on the weight of ester charged to the reaction zones.

7. The method of claim 1, in which the holding time for the dehydration reaction is in the range from about 0.2 to about 1.5 hours.

8. The method of claim 1, in which said ester is preheated to at least about 160° C. before being charged to the reaction zones.

9. The method of claim 1, in which the ratio of dehydration catalyst to ester charged to a reaction vessel is controlled by introducing some of said catalyst into each reaction vessel in a stream separate from the ester inlet line.

10. The method of claim 1, in which said ester is an aromatic ester of hydroxyl-containing fatty acids having more than ten carbon atoms.

11. The method of claim 1, in which said ester is an aliphatic ester of hydroxyl-containing fatty acids having more than ten carbon atoms.

12. The method of claim 1, in which said ester is an ester of an aliphatic polyhydric alcohol and hydroxyl-containing fatty acids having more than ten carbon atoms.

13. The method of claim 1, in which said ester is a fully esterified ester of an aliphatic polyhydric alcohol and hydroxyl-containing fatty acids having more than ten carbon atoms.

14. The method of claim 1, in which said ester is a partly esterified ester of an aliphatic polyhydric alcohol and hydroxyl-containing fatty acids having more than ten carbon atoms.

15. The method of claim 1, in which said ester is an ester of an alphatic monohydric alcohol and an hydroxyl-containing fatty acid having more than ten carbon atoms.

16. A continuous stepwise method for dehydrating a glyceryl ester of hydroxyl-containing fatty acids having more than six carbon atoms which comprises passing said ester at an elevated temperature in the substantial absence of gaseous oxygen through a plurality of reaction vessels in the presence of a dehydration catalyst distributed throughout said reaction vessels, and introducing said catalyst into more than one of said reaction vessels in controlled amounts during the course of the dehydration reaction.

17. The method of claim 16, in which said ester is a fully esterified ester of glycerin and hydroxyl-containing fatty acids having more than ten carbon atoms.

18. The method of claim 16, in which said ester is a partly esterified ester of glycerin and hydroxyl-containing fatty acids having more than ten carbon atoms.

19. The method of claim 16, in which said elevated temperature is in the range from about 240° to about 255° C.

20. The method of claim 16, carried out at a pressure of less than 200 mm. of mercury.

21. A continuous stepwise method for dehydrating castor oil with minimum polymerization of the product which comprises passing said castor oil at an elevated temperature in the substantial absence of gaseous oxygen through a plurality of reaction vessels in the presence of a dehydration catalyst, and introducing said catalyst into more than one of said vessels during the dehydration reaction.

22. The method of claim 21, in which said castor oil being dehydrated is maintained in the reaction vessels until the iodine number (Wijs) of the product is in the range from about 135 to about 145.

23. A continuous stepwise method for dehydrating oxidized linseed oil with minimum polymerization of the product which comprises passing said oxidized linseed oil at an elevated temperature in the substantial absence of gaseous oxygen through a plurality of reaction vessels in the presence of a dehydration catalyst, and introducing said catalyst into more than one of said vessels during the passage of said oil.

24. The method of claim 23, in which said oxidized linseed oil being dehydrated is maintained in the reaction vessels until the iodine number (Wijs) of the product is in the range from about 140 to about 150.

25. A stepwise method for dehydrating a butyl ester of an hydroxyl-containing fatty acid having more than ten carbon atoms with minimum polymerization of the product which comprises passing said ester at an elevated temperature in the substantial absence of gaseous oxygen through a plurality of reaction vessels in the presence of a dehydration catalyst, and introducing said catalyst into more than one of said vessels during the passing of said ester.

26. The method of claim 25, in which said ester is the butyl ester of oxidized linseed oil fatty acids.

27. A continuous stepwise method of dehydrating butyl ricinoleate with minimum polymerization of the product which comprises passing said butyl ricinoleate at an elevated temperature in the substantial absence of gaseous oxygen through a plurality of reaction vessels in the presence of a dehydration catalyst, and introducing said catalyst into more than one of said vessels during the dehydration process.

28. The method of claim 27, in which said elevated temperature is in the range from about 235° to about 250° C.

29. The method of claim 27 carried out at a subatmospheric pressure of less than 200 mm. of mercury.

30. The method of claim 27, in which said butyl ricinoleate being dehydrated is maintained in the reaction vessels until the iodine number (Wijs) of the product is in the range from about 125 to about 135.

31. A continuous stepwise method for dehydrating an ester of a hydroxyl-containing fatty acid having more than ten carbon atoms which comprises passing said ester through a plurality of reaction vessels at elevated temperatures in the substantial absence of gaseous oxygen and in the presence of increasing proportions of catalyst based on the undehydrated ester, said catalyst being introduced into more than one of said vessels during the dehydration process.

32. The method of claim 1, in which said dehydration catalyst is dilute aqueous sodium acid sulfate.

33. A continuous stepwise method for dehydrating an ester of a hydroxyl-containing fatty acid having more than six carbon atoms which comprises passing said ester at an elevated temperature in the substantial absence of gaseous oxygen through a plurality of reaction vessels in the presence of a dehydration catalyst distributed throughout said reaction vessels, and introducing said catalyst into more than one of said reaction vessels in controlled amounts during the course of the dehydration reaction, said dehydration reaction being stopped before the minimum viscosity of the reaction mixture is attained, the total dehydration reaction time being less than about 1.5 hours.

34. A continuous stepwise method for dehydrating a glyceryl ester of hyroxyl-containing fatty acids having more than six carbon atoms which comprises passing said ester at an elevated temperature in the substantial absence of gaseous oxygen through a plurality of reaction vessels in the presence of a dehydration catalyst distributed throughout said reaction vessels, and introducing said catalyst into more than one of said reaction vessels in controlled amounts during the course of the dehydration reaction, said dehydration reaction being stopped before the minimum viscosity of the reaction mixture is attained, the total dehydration reaction time being less than about 1.5 hours.

35. A continuous stepwise method for dehydrating castor oil with minimum polymerization of the product which comprises passing said castor oil at an elevated temperature in the substantial absence of gaseous oxygen through a plurality of reaction vessels in the presence of a dehydration catalyst, and introducing said catalyst into more than one of said vessels during the dehydration reaction, said dehydration reaction being stopped before the minimum viscosity of the reaction mixture is attained, the total dehydration reaction time being less than about 1.5 hours.

IVOR MILTON COLBETH.

REFERENCES CITED

The following references are of record in the file of this patent:

UNITED STATES PATENTS

| Number | Name | Date |
| --- | --- | --- |
| 1,892,258 | Ufer | Dec. 27, 1932 |
| 2,256,880 | Goldsby et al. | July 28, 1942 |
| 2,392,119 | Colbeth | Jan. 1, 1946 |
| 2,428,673 | Miller | Oct. 7, 1947 |

FOREIGN PATENTS

| Number | Country | Date |
| --- | --- | --- |
| 354,783 | Great Britain | Aug. 10, 1931 |

Certificate of Correction

Patent No. 2,567,925 — September 18, 1951

IVOR MILTON COLBETH

It is hereby certified that error appears in the printed specification of the above numbered patent requiring correction as follows:

Column 3, line 48, for "substantialily" read *substantially*; column 12, line 15, in the table, first column thereof, for "Color" read *Color (Gardner Scale)*; column 14, line 52, for "head" read *heat*; column 15, line 70, for "reactoin" read *reaction*; column 18, line 46, for "alphatic" read *aliphatic*; column 19, line 35, for "passing" read *passage*; line 39, for "method of" read *method for*; column 20, line 4, for the claim number "2" read *32*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*